United States Patent
Hurwitz et al.

(10) Patent No.: US 9,035,484 B2
(45) Date of Patent: May 19, 2015

(54) MODULE FOR POWERLINE COMMUNICATION TRANSMISSION

(75) Inventors: Jonathan Ephraim David Hurwitz, Edinburgh (GB); Seyed A A Danesh, Edinburgh (GB); Iain Barnett, Lasswade (GB)

(73) Assignee: Broadcom Corporation, Irvine, CA (US)

( * ) Notice: Subject to any disclaimer, the term of this patent is extended or adjusted under 35 U.S.C. 154(b) by 826 days.

(21) Appl. No.: 13/324,212

(22) Filed: Dec. 13, 2011

(65) Prior Publication Data

US 2012/0183085 A1  Jul. 19, 2012

(30) Foreign Application Priority Data

Dec. 14, 2010 (GB) .................................. 1021180.3

(51) Int. Cl.
*H04B 3/54* (2006.01)
*H04B 3/56* (2006.01)

(52) U.S. Cl.
CPC .. *H04B 3/54* (2013.01); *H04B 3/56* (2013.01); *H04B 2203/5483* (2013.01); *Y10S 307/01* (2013.01)

(58) Field of Classification Search
CPC ............. H04B 3/54; H04B 2203/5462; H04B 2203/5466
USPC .................................................. 307/1, DIG. 1
See application file for complete search history.

(56) References Cited

U.S. PATENT DOCUMENTS

| | | | | |
|---|---|---|---|---|
| 2004/0110483 | A1* | 6/2004 | Mollenkopf | 455/402 |
| 2008/0273613 | A1* | 11/2008 | Kol | 375/260 |
| 2010/0296560 | A1* | 11/2010 | Sadan et al. | 375/222 |
| 2013/0142233 | A1* | 6/2013 | Schwager et al. | 375/222 |

FOREIGN PATENT DOCUMENTS

| | | | | |
|---|---|---|---|---|
| EP | 1892843 | A1 * | 2/2008 | |
| EP | 2028769 | A1 * | 2/2009 | ........... H04L 1/06 |
| WO | WO 2011001430 | A2 * | 1/2011 | |

OTHER PUBLICATIONS

Stadelmeier, Lothar; Schill, Dietmar; Schwager, Andreas; Schneider, Daniel; Speidel, Joachim, "MIMO for Inhome Power Line Communications," Source and Channel Coding (SCC), 2008 7th International ITG Conference on, vol., No., pp. 1,6, Jan. 14-16, 2008.*

* cited by examiner

*Primary Examiner* — Daniel Cavallari
(74) *Attorney, Agent, or Firm* — Garlick & Markison; Bruce E. Garlick

(57) ABSTRACT

A powerline communication (PLC) transmission module transmits a signal over a three-line electrical mains supply. The PLC transmission module includes at least two coupling transformers, each transformer coupling the signal to first and second line-pairs of a three-line electrical mains supply, the first and second line-pairs different from one another. Driving circuitry drives a first version of the signal over the first line-pair and a second version of the signal over the second line-pair. Inversion circuitry selectively inverts one version of the signal relative to the other version of the signal, dependent upon an enacted transmission mode. The inversion circuitry may invert neither/both of the versions of the signal so that the signal is transmitted as a differential-mode signal on the line-pairs or invert one of the first and second versions of the signal relative to the other so that the signal is a common-mode signal.

21 Claims, 4 Drawing Sheets

| | S1 | S2 | S3 | S4 | S5 |
|---|---|---|---|---|---|
| L-N | ON | OFF | ON | OFF | ON |
| L-E | OFF | OFF | ON | ON | OFF |
| N-E | ON | ON | OFF | OFF | OFF |

MODULE FOR POWERLINE COMMUNICATION TRANSMISSION

CROSS-REFERENCE TO PRIORITY APPLICATION

This application claims priority under 35 U.S.C. §119(a) to Great Britain Application Serial No. 1021180.3 filed Dec. 14, 2010, which is incorporated herein by reference in its entirety for all purposes.

BACKGROUND OF THE PRESENT INVENTION

1. Field of the present invention

The present invention is in the field of communications over power lines or the like; and in particular it relates to the transmission of broadband communication data over a three-line electrical mains supply.

2. Description of the Related Art

With the growing need for the exchange of digital content (e.g. MP3 audio, MPEG4 video and digital photographs) there is a widely recognized need to improve digital communication systems. Powerline communication (PLC) is a technology that encodes data in a signal and transmits the signal on existing electricity powerlines in a band of frequencies that are not used for supplying electricity. Accordingly, PLC leverages the ubiquity of existing electricity networks to provide extensive network coverage. Furthermore, since PLC enables data to be accessed from conventional power-outlets, no new wiring needs to be installed in a building (or different parts of a building). Accordingly, PLC offers the additional advantage of reduced installation costs.

The power mains that carry PLC communications typically include a Live (L) conductor and a Neutral (N) conductor. However, many power mains also include a third conductor. The United Kingdom, Europe, and the United States all have domestic electricity supplies that often include an Earth or Ground line as well. Many United States installations include multiple live paths with different phases. However the Neutral and Earth for the different phases are typically common to the multiple live paths.

Traditionally, PLC are serviced differentially across Live (L) and Neutral (N) conductors. Using Neutral (N) and Earth (E) as well as the Live and Neutral conductors may provide some benefits. In homes that use multiple phases, the PLC signal will not be attenuated as it travels from one phase to another, since the Neutral and Earth line is common. Also there is less noise on the Neutral and Earth lines. Further advantages can be gained by using all of the possible line combinations and choosing the best pair for transmission depending on a specific situation.

FIG. 1 illustrates prior art PLC transmission circuitry. Line-drivers 110 are each connected to one of the three pair combinations L-N, N-E, and L-E via coupling transformers 120. When one line-driver is switched on, the other two go to high-impedance. This allows transmission on one of conductor pairs L-N, N-E, or L-E.

FIG. 2 illustrates further prior art PLC transmission circuitry. The structure of FIG. 2 is a variation on the structure of FIG. 1 with a single line-driver 110 used. As compared to the structure of FIG. 1, the structure of FIG. 2 uses less area and is a more efficient solution. A switching network 130 works in conjunction with the single line-driver 110 to select which line combination is used for PLC signal coupling.

BRIEF DESCRIPTION OF THE DRAWINGS

Embodiments of the present invention will now be described, by way of example only, by reference to the accompanying drawings, in which.

DETAILED DESCRIPTION OF THE EMBODIMENTS

Figure 1:
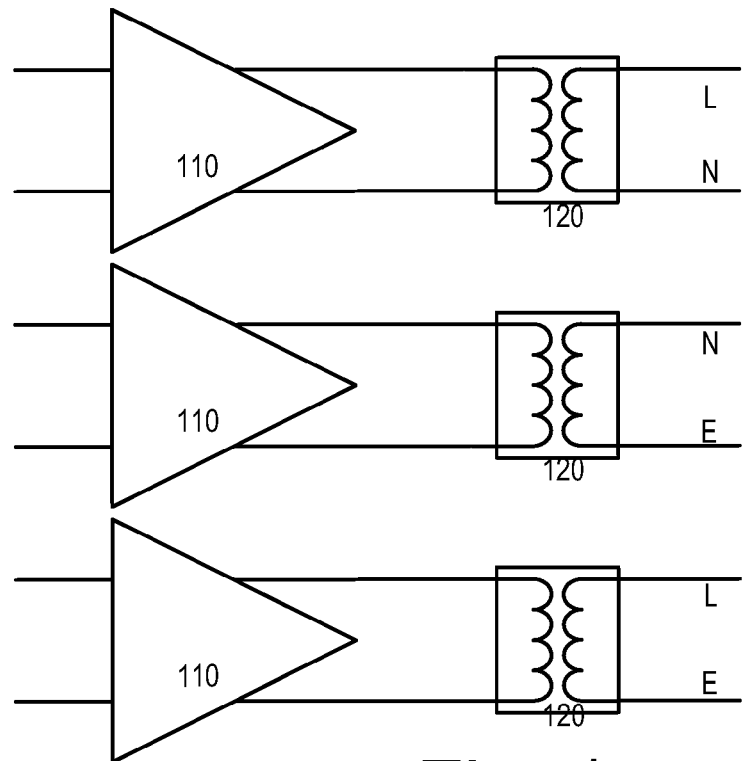
FIG. 1 illustrates prior art PLC transmission circuitry.
Figure 2:
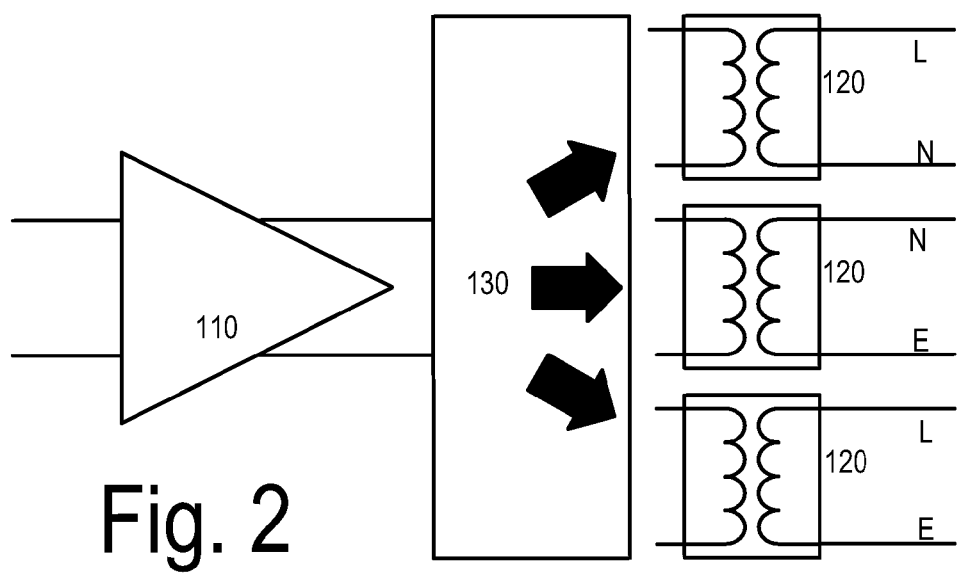
FIG. 2 illustrates further prior art PLC transmission circuitry.

The present invention relates to Powerline Communications (PLCs) and specifically to a module for transmitting broadband communication data over a three-line electrical mains supply. Traditionally powerline communication is done across Live (L) and Neutral (N). However, many supplies have a third, Earth (or Ground) line. This provides three possible line-pair combinations for transmission.

According to a first aspect of the present invention, a powerline communication transmission module is operable to transmit a signal over a three-line electrical mains supply and includes at least two coupling transformers, each transformer for coupling the signal to a different line-pair of a three-line electrical mains supply. The transmission module further includes driving circuitry for driving a first version of the signal over a first of two different line-pairs, and for driving a second version of the signal over a second of the two different line-pairs. Inversion circuitry of the transmission module selectively inverts one version of the signal relative to the other prior to transmission, in dependence of an enacted transmission mode.

The line common to both of the different line-pairs of the mains electrical supply lines may be the Earth or the Ground line. The transmission module may be operable to transmit in a first transmission mode, whereby the first and second versions of the signals are not inverted relative to the other, the first transmission mode transmitting the signal as a differential-mode signal on both line-pairs simultaneously. The transmission module may also be operable to transmit in a second transmission mode, whereby one of the first and second versions of the signal is inverted relative to the other, the second transmission mode transmitting the signal as a common-mode signal on the line common to both line-pairs. The transmission module may be operable to transmit the signal repeatedly using both of the transmission modes so as to determine the best mode for transmission.

The transmission module may further include circuitry to vary the gain of one or both of the first and second versions of the signal. The circuitry to vary the signal gain may be included in the line driving circuitry, or alternatively in a digital to analog converter included in the transmission module. The transmission module may be operable to transmit the signal repeatedly at a plurality of different relative gain settings so as to determine the best gain setting(s) for transmission.

The transmission module may further include reception circuitry including a switch network allowing reception on any combination of line-pairs of the three-line electrical mains supply. Said transmission module may be operable to try reception on each combination of line-pairs so as to determine the best for reception. Said reception circuitry may include selectable resistance in each reception path, the resistance selected to obtain best reception. The transmission module may be operable to maintain a table of transmission and/or reception settings that suit each node in the network.

Figure 3:
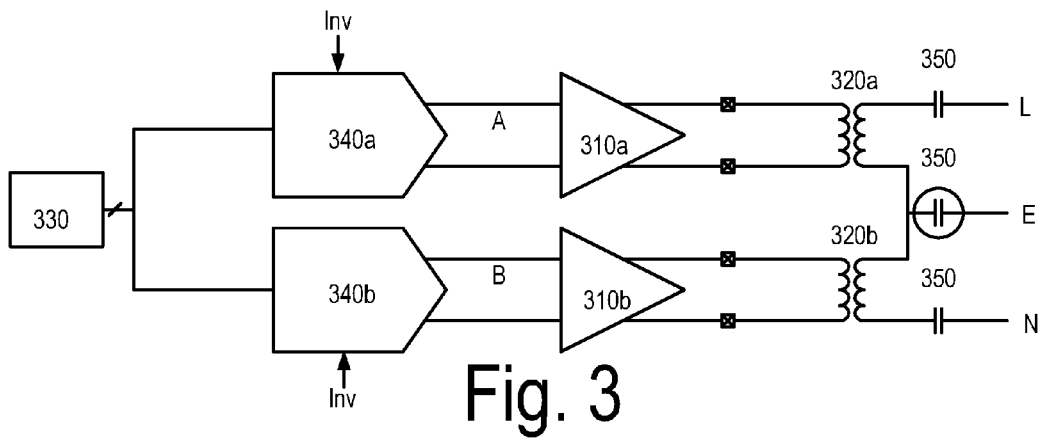
FIG. 3 illustrates PLC transmission circuitry according to a first embodiment of the present invention.

FIG. 3 illustrates a powerline communication transmission arrangement according to an embodiment of the present invention. It includes a single digital front end (DFE) 330, two digital to analog converters (DACs) 340a, 340b, two line drivers 310a, 310b and only two transformers 320a, 320b, coupling two transmission paths (via coupling capacitors 350 to block the mains power frequency signals). The single digital front end 330 (and Digital Signal Processor, DSP) generates the signal to be transmitted. The signal is forwarded to two identical paths A and B, each including a DAC 340a, 340b and a Line-Driver 310a, 310b. Importantly, the signal in one of the transmission paths can be inverted in relation to the other.

If both paths are enabled and inverted (or neither inverted), the signal on both transmission paths A and B will be the same. This will result in a differential signal across the Live and Neutral wires, and effectively no signal on Earth. In this mode, power combining has effectively taken place, and the signal is communicated differentially. Power combining is a known technique where the signal power produced from multiple line-drivers (a minimum of 2) are combined using a multi-tap transformer, or (as is effectively the case here, when operating in this differential mode) two transformers in series. As a result, the signals are combined to build one signal, which is communicated over one differential line with the combined power of each individual line-driver.

Should the inversion be switched off in one of the paths A or B such that one path is inverted relative to the other, this will result in common-mode transmission, since the same signal is transmitted (in phase) on both Live and Neutral, so there is no differential signal across them, with the signal actually travelling across Earth, which is the common mode signal.

It is possible using only two transmission paths to transmit differential or common-mode and to choose between the modes in real time. Furthermore, when transmitting in differential mode, the signal power is effectively doubled as a result of power combining, while transmitting in common-mode results in the signal being transmitted on Live-Earth and Neutral-Earth simultaneously.

Figure 4:
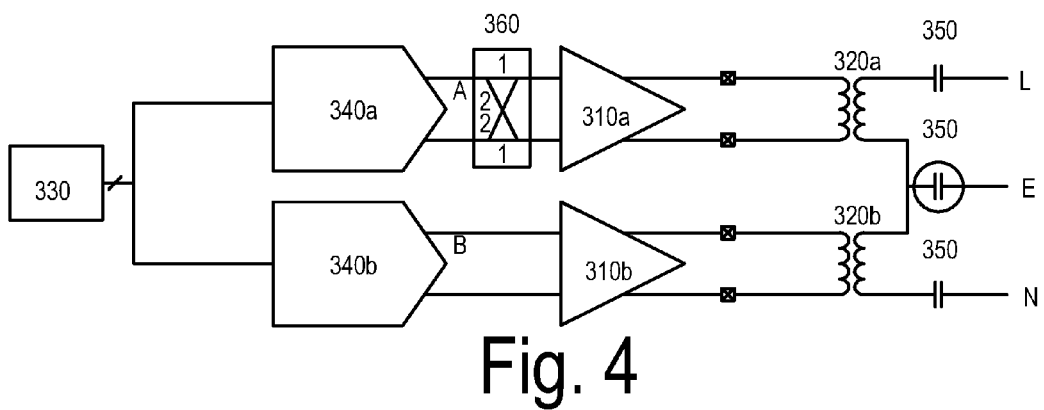
FIG. 4 illustrates a variation on the PLC transmission circuitry of FIG. 3.

FIG. 4 illustrates an alternative arrangement whereby the phase inversion is done in the analog domain, by phase switcher 360 switching the positive and negative signals for one of the transmit paths.

Figure 5:
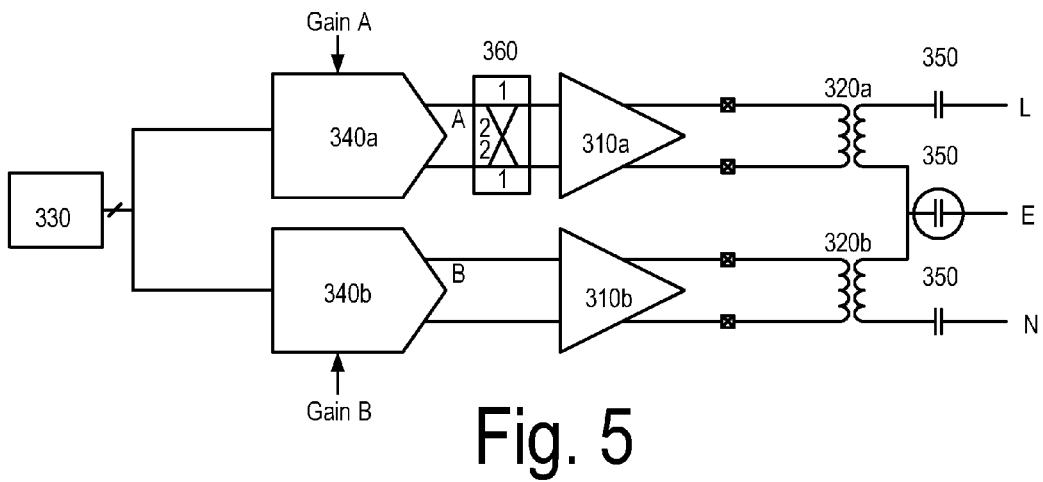
FIG. 5 illustrates a further variation on the PLC transmission circuitry of FIG. 3.

FIG. 5 illustrates an alternative arrangement to that of FIG. 4. Here the DACs 340a, 340b allow the adjustment of the relative gain of channel A and B such that the signal balance can be changed. This results in different signals being transmitted between L-E and N-E and effectively L-N. This feature can be used to adjust the balance so as to effectively perform beamforming, thereby obtaining a better signal quality at a certain point of the network.

Figure 6:
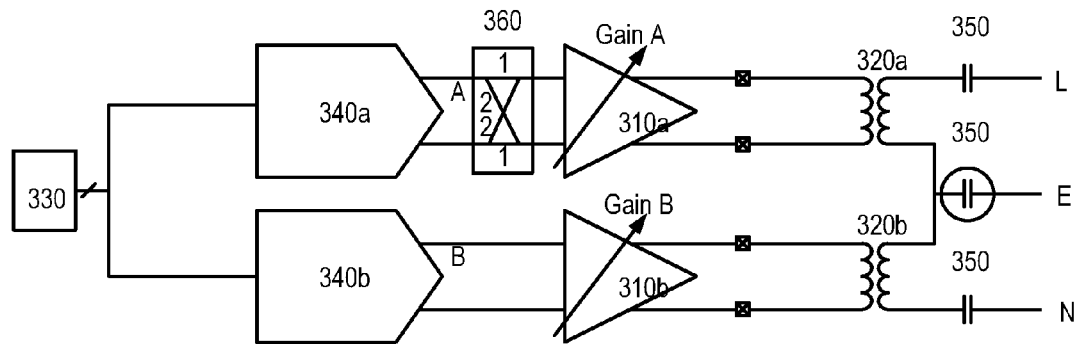
FIG. 6 illustrates a variation on the PLC transmission circuitry of FIG. 5.

FIG. 6 illustrates an alternative arrangement to that of FIG. 5 whereby the gain is applied in the analog domain rather than the digital domain. The transmitter can be made to sweep the relative gain of path A compared to path B, while sending a predetermined signal and while the receiver listens and monitors channel quality. Once it finds the balance of gain between A and B which results in the best communication setup between these two nodes it can communicate this back to the transmitting node so that, from then on, it communicates with that particular balance of gain between A and B. The transmitter node can also maintain a table of gain settings which suit each node in the network and, when communicating to each node, it can check this table, and communicate with the gain balance which results in the best communication to that node.

Figure 7:
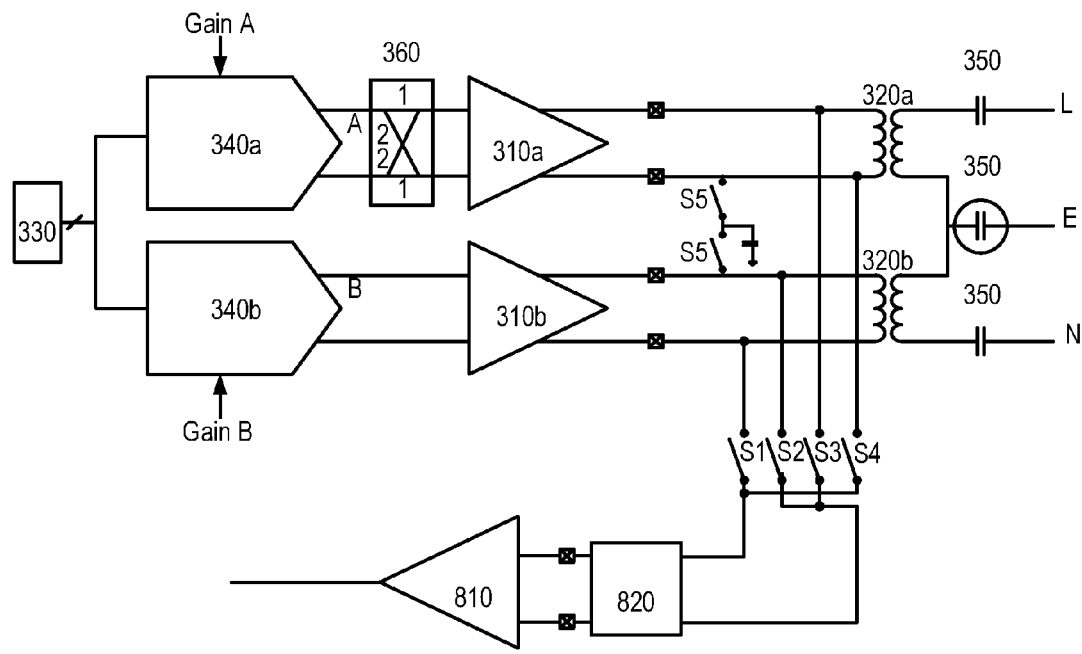
FIG. 7 illustrates combined PLC transmission and reception circuitry according to a first embodiment of the present invention.

FIG. 7 illustrates a combined transmission and reception node. The receiver circuitry includes a single filter 820 and receiver 810, which are able to listen on L-N or L-E or N-E as a result of switch network S1-S5, which allows the selection of the line-pair to which the receiver listens. Switch S5 could be implemented as a single switch simply connecting the two lines, but is implemented here as a pair of switches to a virtual AC earth point. This removes noise as switch S5 is only closed during the differential mode (L-N) when there is no signal carried on Earth.

The receiver circuitry can also listen in common-mode or differential, and can be switchable between the two in real-time. The receiver circuitry can listen to each line-pair, and choose the best path for listening to. The table at the bottom of FIG. 7 illustrates the switch combinations required for reception on each possible line-pair, for this embodiment.

The multi-phase receiver circuitry can be combined with the gain sweep algorithm described above, such that the transmission circuitry can send a pre-determined signal in each mode (common mode and differential mode) over the gain balance range, while the receiver listens to the gain sweep on all different phase combinations, thereby determining the best gain and phase choice to achieve the highest bandwidth. It should be appreciated that just because a transmitter is set to send a signal using one particular phase combination does not necessarily mean that this is the best combination for the receiver.

Figure 8:
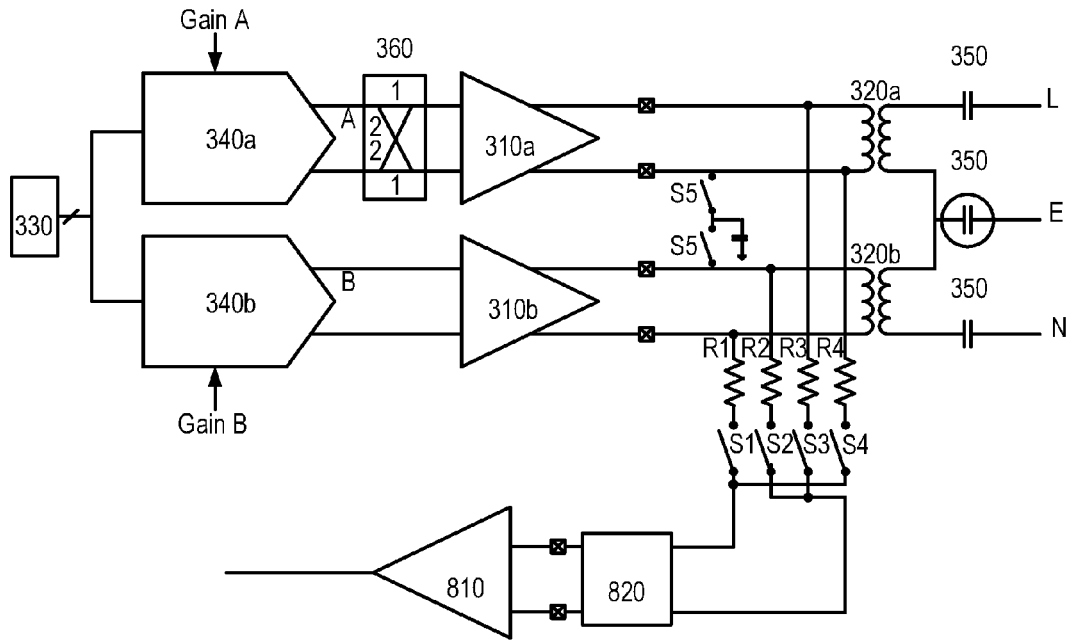
FIG. 8 illustrates a variation of the combined PLC transmission and reception circuitry of FIG. 7.

FIG. 8 illustrates a variation on the FIG. 7 arrangement in which a resistor R1-R4 is included in each reception path, so as to enable the effective weighting and combination of these different paths, should a certain weighting result in a better performing solution.

Figure 9:
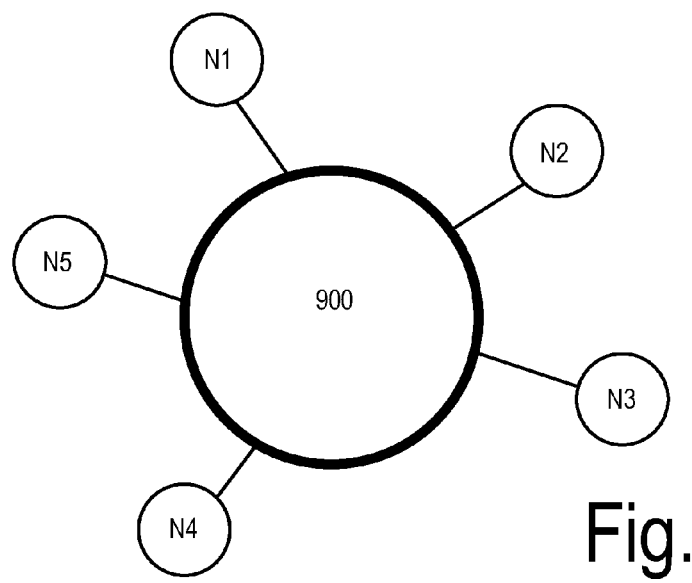
FIG. 9 illustrates a network of nodes connected using the circuitry according to any embodiment of the present invention.

FIG. 9 illustrates a network 900, such as a single home network, including five nodes N1-N5 which are accessed through three-line L-N-E wiring via a conventional 3-pin plug. Each node can be configured to learn (by performing sweeps as described above) the send and receive settings that are best for communicating with any other particular node. The settings in this case may include one or more of (where the functionality exists): which send and receive line-pairs are used, the gain balance and any receiver resistance settings.

It may be that some nodes are connected to the network via only Live-Neutral wiring. This can be accommodated by the network, in such a way that, for important parts of the network communication system, priority resolution nodes can communicate in a way that all nodes, including Live-Neutral only nodes, can receive and communicate with them.

Circuitry described herein that performs particular functions described herein may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions, which may be considered singularly or in combination a "processing module." The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributed located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry including the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the FIGs. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

The present invention has also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the present invention.

Moreover, although described in detail for purposes of clarity and understanding by way of the aforementioned embodiments, the present invention is not limited to such embodiments. It will be obvious to one of average skill in the art that various changes and modifications may be practiced within the spirit and scope of the present invention.

The invention claimed is:

1. A powerline communication transmission module for transmitting a signal over a three-line electrical mains supply comprising:

at least two coupling transformers, each transformer for coupling the signal to first and second line-pairs of a three-line electrical mains supply, the first and second line-pairs different from one another;

driving circuitry for driving a first version of the signal over the first line-pair, and for driving a second version of the signal over the second line-pair; and at least one inversion circuit for selectively causing one version of the signal to be inverted relative to the other version of the signal prior to transmission, dependent upon an enacted transmission mode.

2. The powerline communication transmission module of claim 1, wherein a line common to both the first and second line-pairs of the mains electrical supply lines comprises an Earth or Ground line.

3. The powerline communication transmission module of claim 1, wherein in a first transmission mode:
the inversion circuitry is operable to process the first and second versions of the signal so they are non-inverted relative to one another; and
the driving circuitry is operable so that the first and second versions of the signal are not inverted relative to the other with the signal transmitted as a differential-mode signal on both line-pairs simultaneously.

4. The powerline communication transmission module of claim 1, wherein in a second transmission mode:
the inversion circuitry is operable to invert one of the first and second versions of the signal relative to the other; and
the driving circuitry is operable to transmit the first and second versions of the signal as a common-mode signal on both line-pairs.

5. The powerline communication transmission module of claim 1, further comprising gain circuitry operable to vary the signal gain of one or both of the first and second versions of the signal.

6. The powerline communication transmission module of claim 5, wherein the gain circuitry comprises line driving circuitry.

7. The powerline communication transmission module of claim 5, wherein the gain circuitry comprises a digital to analog converter having variable gain.

8. The powerline communication transmission module of claim 5, wherein the gain circuitry is operable to transmit the signal repeatedly at a plurality of different relative gain settings so as to determine a best gain for transmission.

9. The powerline communication transmission module of claim 1, wherein the transmission circuitry is operable to transmit the signal repeatedly using a plurality of modes to determine a best performing transmission mode.

10. The powerline communication transmission module of claim 1, further comprising reception circuitry having a switch network and operable to support reception of incoming signals on multiple combinations of line-pairs of the three-line electrical mains supply.

11. The powerline communication transmission module of claim 10, wherein the transmission module is operable to receive incoming signals on each combination of line-pairs to determine a best performing line-pair combination.

12. The powerline communication transmission module of claim 10, wherein the switch network comprises a plurality of selectable resistances in each reception path.

13. The powerline communication transmission module of claim 10, further comprising a table of preferable transmission and/or reception settings for at least some of the other nodes of a network in which it forms a node.

14. A method for operating a powerline communication transmission module to transmit a signal over a three-line electrical mains supply, the method comprising:
coupling the signal to first and second line-pairs of a three-line electrical mains supply via at least two coupling transformers, the first and second line-pairs different from one another;
driving a first version of the signal on the first line-pair;
driving a second version of the signal on the second line-pair; and
selectively inverting one version of the signal relative to the other version of the signal prior to transmission, dependent upon an enacted transmission mode.

15. The method of claim 14, further comprising, in a first transmission mode, transmitting the first and second versions of the signal on both line-pairs simultaneously such that they are not inverted relative to one another as a differential-mode signal.

16. The method of claim 14, further comprising, in a second transmission mode:
inverting one of the first and second versions of the signal relative to the other; and
transmitting the first and second versions of the signal as a common-mode signal on both line-pairs simultaneously.

17. The method of claim 14, further comprising varying the signal gain of one or both of the first and second versions of the signal.

18. The method of claim 14, further comprising transmitting the signal repeatedly at a plurality of different relative gain settings so as to determine a best gain for transmission.

19. The method of claim 14, further comprising transmitting the signal repeatedly using a plurality of modes to determine a best performing transmission mode.

20. The method of claim 14, further comprising receiving incoming signals on multiple combinations of line-pairs of the three-line electrical mains supply.

21. The method of claim 20, further comprising receiving incoming signals on each combination of line-pairs to determine a best performing line-pair combination.

* * * * *